US008717226B2

(12) United States Patent
Bon et al.

(10) Patent No.: US 8,717,226 B2
(45) Date of Patent: May 6, 2014

(54) METHOD FOR PROCESSING SIGNALS OF AN AIRBORNE RADAR WITH CORRECTION OF THE ERROR IN THE RADAR BEAM POINTING ANGLE AND CORRESPONDING DEVICE

(75) Inventors: Nicolas Bon, Brest (FR); Jean-Paul Artis, Plouzane (FR)

(73) Assignee: Thales, Neuilly sur Seine (FR)

( * ) Notice: Subject to any disclaimer, the term of this patent is extended or adjusted under 35 U.S.C. 154(b) by 396 days.

(21) Appl. No.: 12/611,415

(22) Filed: Nov. 3, 2009

(65) Prior Publication Data

US 2010/0109935 A1 May 6, 2010

(30) Foreign Application Priority Data

Nov. 4, 2008 (FR) ...................................... 08 06138

(51) Int. Cl.
*G01S 13/50* (2006.01)
(52) U.S. Cl.
USPC .............................................. 342/75; 342/77
(58) Field of Classification Search
USPC ........................................................ 342/77, 75
See application file for complete search history.

(56) References Cited

U.S. PATENT DOCUMENTS

| | | | |
|---|---|---|---|
| 3,164,828 A * | 1/1965 | Powley et al. ................... 342/65 |
| 5,485,156 A | 1/1996 | Mansuer et al. | |
| 6,184,825 B1 * | 2/2001 | Wehner et al. ................ 342/359 |
| 6,208,937 B1 * | 3/2001 | Huddle ......................... 701/472 |
| 6,646,598 B1 | 11/2003 | Timothy et al. | |
| 6,853,330 B1 | 2/2005 | Krikorian et al. | |
| 7,196,653 B2 * | 3/2007 | Hall et al. ..................... 342/25 F |
| 7,307,583 B1 | 12/2007 | Woodell et al. | |
| 7,561,098 B2 * | 7/2009 | Christianson ................... 342/75 |
| 7,965,225 B1 * | 6/2011 | Dickerson et al. .............. 342/73 |
| 2008/0018524 A1 | 1/2008 | Christianson | |

OTHER PUBLICATIONS

Zhang Yabiao et al., "Effect of Beam-Pointing Errors on Bistatic SAR Imaging", Journal of Systems Engineering and Electronics, Feb. 1, 2008, pp. 88-93, vol. 19, No. 1, Second Academy Ministry of Aero-Space Industry, Beijing, China.

* cited by examiner

*Primary Examiner* — Matthew M Barker
(74) *Attorney, Agent, or Firm* — Baker & Hostetler LLP

(57) ABSTRACT

A method for processing signals of an airborne radar includes a correction of the erroneous angle of pointing of the radar beam, comprising an evaluation of the error in the pointing angle for a constant height of the aerial transporter. For a given angle of scan, the method carries out at least two series of measurements of the power of the echoes returned following the emission of radar signals, each series being associated with a given distance-bin, the measurements being dependent on the angle of pointing of the radar antenna, formulates a vertical profile of the power of the echoes returned for each series of measurements, and then on the basis of each vertical profile, measures the pointing angle corresponding to a power of the echoes returned by the ground alone, and calculates the error in the pointing angle on the basis of the measured pointing angles.

23 Claims, 8 Drawing Sheets

METHOD FOR PROCESSING SIGNALS OF AN AIRBORNE RADAR WITH CORRECTION OF THE ERROR IN THE RADAR BEAM POINTING ANGLE AND CORRESPONDING DEVICE

CROSS-REFERENCE TO RELATED APPLICATIONS

This application claims priority of French application no. FR 08/06138, filed Nov. 4, 2008, the disclosure of which is hereby incorporated by reference in its entirety.

FIELD OF THE INVENTION

The invention belongs to the realm of the processing of radar signals, in particular for airborne radars.

More precisely, the invention pertains to the processing of these radar signals with the aim of correcting the radar antenna beam pointing errors.

BACKGROUND OF THE INVENTION

It is recalled that an airborne radar comprises a transmitter which emits signals, more precisely radio waves. The latter are reflected by the target and detected by a receiver, also incorporated within the radar. The position of the targets lying in the field of the emitted radio waves is estimated by virtue of the return time of the reflected waves.

More precisely, the position of a target is deduced from the attitude of the aerial transporter and the angle of pointing of the radar antenna. By "the attitude of the aerial transporter" is meant the values taken by its roll and pitch angles. These values are generally obtained with the aid of sensors such as gyroscopes, acceleration sensors and angular rate sensors.

Within the framework of certain applications, it is very important to reduce the uncertainties relating to the radar antenna beam pointing angle. Now, the aforesaid sensors give rise to fixed and dynamic errors in the measurements of the roll and pitch angles.

Other inevitable errors are related to the installation of the radar on the aerial transporter, to the inertial platform, to the deformation of the structure of the aircraft or of the materials of the structure forming the support of the pedestal of the radar (situated in a non-pressurized environment).

Errors are also related to the positioning of the beam of the radar antenna itself, due for example:

to the installation of the radar on the transporter, to the deformation of the structure of the aircraft or of the materials which constitute the support of the pedestal of the radar, or else to the calibration of the radar beam itself.

By way of example, an error of 1 degree in the angle of the radar beam gives rise to an error of 6500 m of altitude in the location of a target, at 200 NM.

A scheme for compensating for the pitch angle error is known from the document U.S. Pat. No. 5,485,156. This comprises two sightings with the aid of the radar beam, for two angles of elevation that are close together in elevation, an identification of the shape of the antenna pattern with the aid of the signal reflected by the ground. The difference between the position of the ground and the angle of elevation measured by the sensor then gives the error to be compensated.

Nevertheless, because of the use of an external sensor (radioaltimeter) to accurately ascertain the altitude and because of the disregarding of the relief of the ground and of the curvature of the earth, numerous errors appear. The scheme is therefore rather unreliable.

Moreover, the estimation of the position of the antenna pattern on the basis of only two elevational pointings can lead to errors with respect to a device that uses more elevational pointings.

Finally, the scheme proposed by the document U.S. Pat. No. 5,485,156 disregards the presence of possible disturbances (meteorological phenomena: cloud, hail, etc., other aircraft, etc.), which is detrimental to the compensation for the angle of elevation error.

The invention is aimed notably at solving these problems.

SUMMARY OF THE INVENTION

For this purpose, according to a first aspect, there is proposed a method for processing signals of an airborne radar comprising a correction of the erroneous angle of pointing of the radar beam, comprising an evaluation of the said error in the pointing angle for a constant height of the aerial transporter.

According to a general characteristic of this first aspect, the evaluation comprises for a given angle of scan:

the carrying out of at least two series of measurements of the power of the echoes returned following the emission of radar signals, each series being associated with a given distance-bin, the measurements being dependent on the angle of pointing of the radar antenna, a formulation of a vertical profile of the power of the echoes returned for each series of measurements, and then on the basis of each vertical profile, a measurement of the pointing angle corresponding to a power of the echoes returned by the ground alone, and a calculation of the said error in the pointing angle on the basis of the measured pointing angles.

Stated otherwise, several pointing angle measurements are performed with the aid of the power of the properly chosen echoes returned, so as to be able to calculate the said pointing error.

Consequently, unlike the prior art, this first aspect does not depend in any way on results arising from onboard sensors, which was the cause of the inaccuracy in the results, but on measurements of the power of the returned echoes.

According to one mode of implementation, the evaluation of the error in the pointing angle is carried out in a dynamic manner.

This mode of implementation has the advantage of updating the value of the error in the pointing angle.

Preferably, for a given distance bin, the calculation of the said error in the pointing angle is furthermore dependent on the curvature of the earth, evaluated on the basis of the measured pointing angle and the estimated height of the ground.

For example, the height of the ground can be estimated with the aid of a digital terrain model.

This scheme has the advantage of delivering an extremely accurate result.

In this case the evaluation of the error in the pointing angle can comprise, after each calculation step, an exclusion of the measured pointing angle values signalling the presence of meteorological echoes.

As a variant, for a given distance bin, a height of the ground can be estimated directly on the basis of the corresponding measured pointing angle.

In this case, preferably, the evaluation of the error in the pointing angle can comprise after each calculation step:

an exclusion of the pointing angle values signalling the presence of meteorological echoes, a selection of the values of height of the ground corresponding to a constant ground height to within an error and whose values are below a given threshold.

According to one mode of implementation, the said measurement of the pointing angle for which ground echoes are returned, can comprise a formulation of a synthetic vertical profile of the power of the echoes returned by the ground alone, and for each measured vertical profile:

a superposition of the synthetic vertical profile with the formulated vertical profile of power considered, doing so for various values of the angle of pointing, a calculation of the error existing between the formulated vertical profile of power and the synthetic vertical profile, for each value of the pointing angle considered, and a selection of the value of the pointing angle for which the calculated error is a minimum, the said selected value corresponding to the pointing angle for which ground echoes are returned.

For example, the said collation may be performed only for certain points of the formulated vertical profile, corresponding to pointing angle values below a given threshold.

As a variant, the said collation can be performed for the whole set of points of the measured vertical profile, if the number of points of the measured vertical profile is below a given threshold.

For example, the calculation of the error in the pointing angle can be based on the following expression:

$$\Delta\varphi_i = \frac{r_i\sin(\varphi_i) - r_{i+L}\sin(\varphi_{i+L}) - (h_{ci} - h_{si}) + (h_{ci+L} - h_{si+L})}{r_i\cos(\varphi_i) - r_{i+L}\cos(\varphi_{i+L})}, ,$$

where:

$\Delta\varphi_i$ is the radar beam pointing angle error evaluated at the instant t, $r_i$ and $r_{i+L}$ are the distances respectively between the radar antenna and the two distance bins considered at ground level, $\varphi_i$ and $\varphi_{i+L}$ are the two pointing angles, respectively associated with the distances $r_i$ and $r_{i+L}$, $h_{si}$ and $h_{si+L}$ are the ground height values respectively situated at the distances $r_i$ and $r_{i+L}$, and $h_{ci}$ and $h_{ci+L}$ connote values induced by the curvature of the earth and respectively associated with the distances $r_i$ and $r_{i+L}$.

As a variant, the calculation of the error in the pointing angle can be based on the following expression:

$$\hat{x} = (H^T H)^{-1} H^T y, \text{ with}$$

$$\hat{x} = \begin{pmatrix} h_{craft} \\ \Delta\varphi \end{pmatrix}$$

where $h_{craft}$ is the altitude of the aerial transporter and $\Delta\varphi$ is the error of the angle of scan of the radar beam, $$H = \begin{pmatrix} 1 & r_1\cos\varphi_1 \\ \vdots & \vdots \\ 1 & r_M\cos\varphi_M \end{pmatrix},$$

where M is the number of measurements performed of the power of the echoes returned, $r_1 \ldots r_M$ are the distances between the radar antenna and each of the M distance bins considered at ground level, and $\varphi_1 \ldots \varphi_M$ are the M pointing angles respectively associated with the distances $r_1 \ldots r_M$, and $$y = \begin{pmatrix} r_1\sin\varphi_1 + h_{s1} - h_{c1} \\ \vdots \\ r_M\sin\varphi_M + h_{sM} - h_{cM} \end{pmatrix},$$

where $h_{s1} \ldots h_{s2}$ are the ground height values respectively associated with the distances $r_1 \ldots r_M$, and $h_{c1} \ldots h_{cM}$ connote the values of the curvature of the earth, respectively associated with the distances $r_1 \ldots r_M$.

Preferably, the angle of pointing is the angle of elevation and the angle of scan is the angle of bearing.

Thus, the processing method can be performed more rapidly.

Preferably, each measurement series comprises at least three measurements.

According to another aspect, there is proposed a device for processing signals of an airborne radar comprising a means for correcting the erroneous angle of pointing of the radar beam, and a means for evaluating the said error in the pointing angle for a constant height of the aerial transporter.

According to a general characteristic of this other aspect, it comprises:

a measurement means able to carry out at least two series of measurements of the power of the echoes returned following the emission of radar signals, each series being associated with a given distance bin, the measurements being dependent on the angle of pointing of the radar antenna, a formulation means able to formulate a vertical profile of power of the echoes returned for each series of measurements, another measurement means able on the basis of each vertical profile to measure the angle of pointing corresponding to a power of the echoes returned by the ground alone, and a calculation means able to calculate the said error in the pointing angle on the basis of the said measured pointing angles.

According to one embodiment, the other measurement means can comprise a sub-means for formulating a synthetic vertical profile of the power of the echoes returned by the ground alone and a processing sub-means able for each formulated vertical profile:

to superimpose the synthetic vertical profile with the formulated vertical profile considered, for various values of the angle of pointing, to calculate the error existing between the formulated vertical profile and the synthetic vertical profile, for each value of the pointing angle considered, to select the value of the pointing angle for which the calculated error is a minimum.

According to another aspect, there is proposed a receiver of radar type incorporating a device such as mentioned above.

BRIEF DESCRIPTION OF THE DRAWINGS

Other advantages and characteristics of the invention will be apparent on examining the detailed description of a wholly non-limiting mode of implementation of a method according to the invention as well as a wholly non-limiting embodiment of a device according to the invention, and the appended drawings in which.

DETAILED DESCRIPTION

Figure 1:
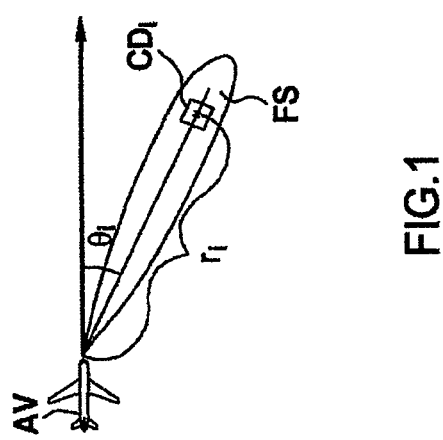

In FIG. 1 is represented an aerial transporter AV (here an aircraft) seen from above and furnished with a radar. The radar beam is referenced FS. The space aimed at by the radar beam FS is divided into distance bins. One of these distance bins of rank i referenced CDi, is illustrated in FIG. 1. A distance bin is an elementary three-dimensional analysis cell. The response of the environment to the emission of the radar signal is studied for each distance bin CDi. The number of distance bins increases or decreases as a function of the resolution of the radar used.

The distance between the radar antenna of the aircraft AV and the intersection of the distance bin CDi with the ground is denoted $r_i$. The distance $r_i$ will subsequently be referred to as: the distance between the radar antenna and the distance cell CDi.

The angle of bearing in relation to the distance bin CDi considered is denoted $\theta_i$. It is recalled that the angle of bearing is the angle formed between the axis of the aircraft and the beam, in the horizontal plane.

Figure 2:
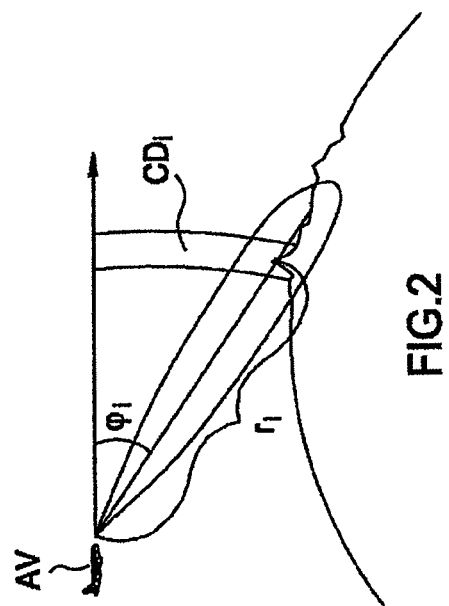
FIGS. 1 and 2 illustrate the angular coordinates of a radar beam according to various views.

FIG. 2 represents the same aircraft AV but seen side-on. The elements in common between the two FIGS. 1 and 2 preserve the same references. The angle of elevation for the ground zone incorporated within the distance bin CDi is denoted $\phi_i$. It is recalled that the angle of elevation (or angle of site) is the angle formed between the horizon and the radar beam FS (in a horizontal plane).

In a simplified manner, the invention is based on measurements of the angle of elevation of the beam on the basis of a vertical profile of the power of the returned echoes.

The consideration of at least two measurement series makes it possible to circumvent the height of the aircraft conventionally delivered by an altimeter carried onboard to the north of the aircraft.

Figure 3:
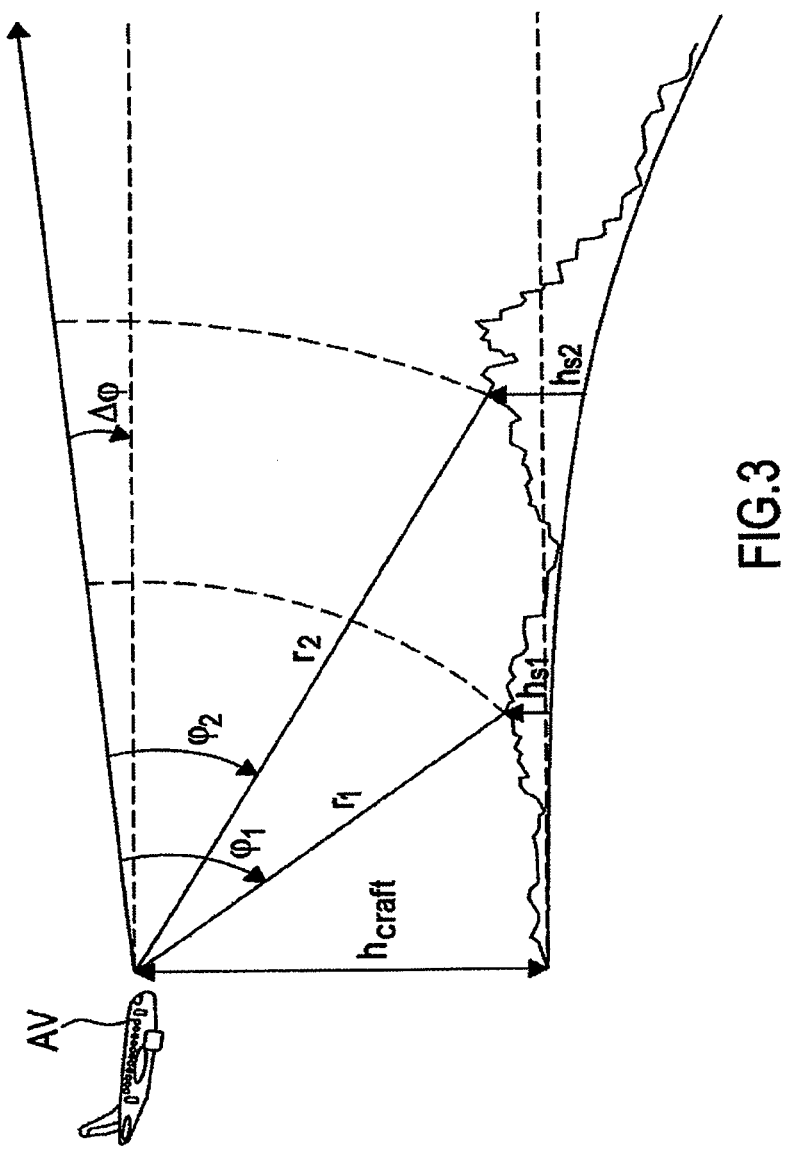
FIG. 3 represents a configuration of an aircraft during the execution of the invention.
Figure 4:
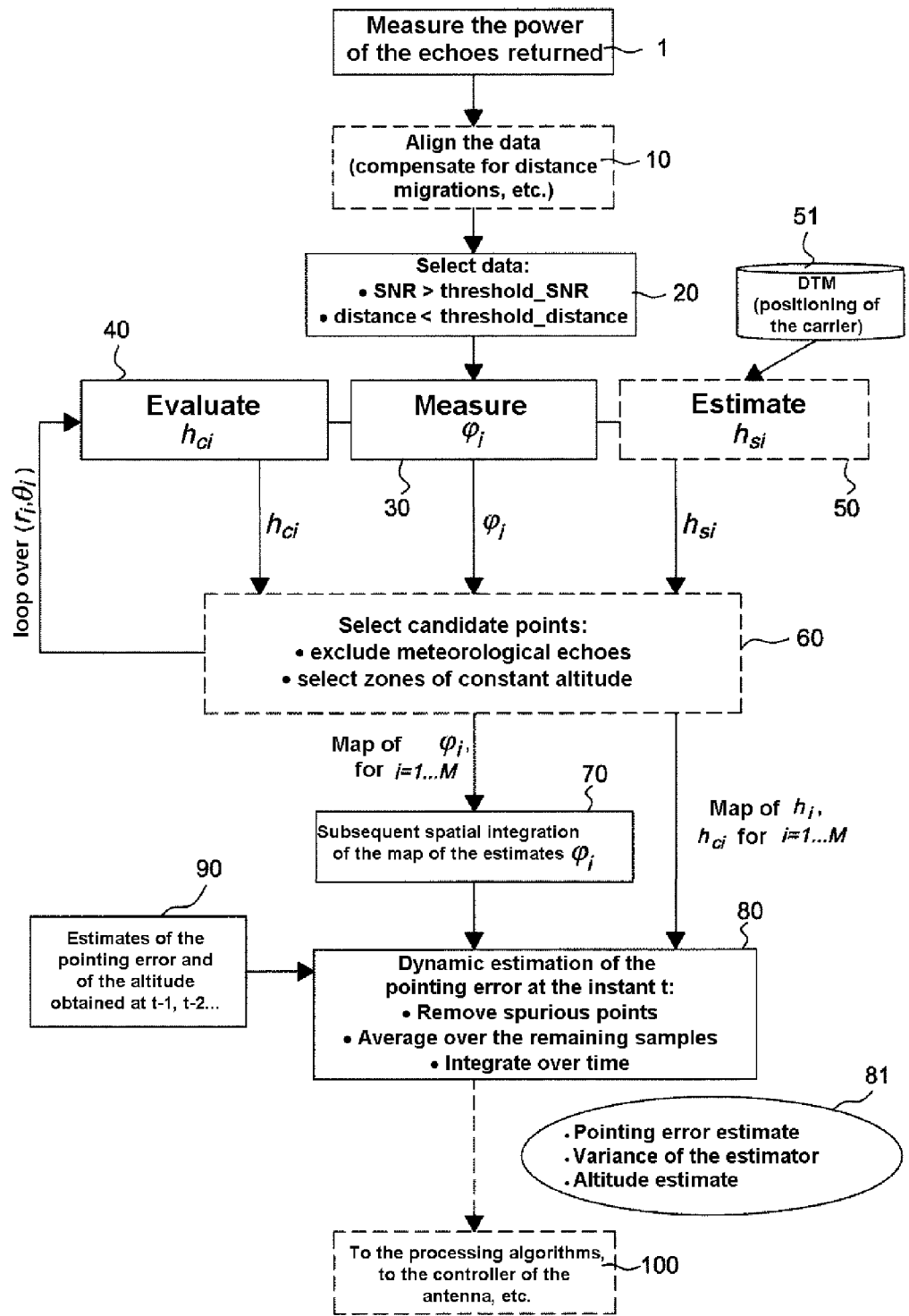
FIG. 4 illustrates a mode of implementation of the method according to the invention.

A mode of implementation of the invention is described more precisely in FIGS. 3 and 4.

As indicated above, the mode of implementation considered is based on two measurement series. The number of two measurement series is given by way of example.

The measurements performed involve various parameters illustrated in FIG. 3.

A first series of measurements is performed for a distance bin situated at a distance $r_1$ from the radar antenna, so as to determine a first angle of elevation. At this spot the ground is at a height $hs_1$. The corrupted angle of elevation for which ground echoes are returned is denoted $\phi_1 + \Delta\phi$, $\Delta\phi$ being the error of the angle of elevation that one seeks to compensate.

A second series of measurements is performed for a distance bin situated at a distance $r_2$ from the radar antenna, so as to determine a second angle of elevation. At this spot the ground is at a height $hs_2$. The corrupted angle of elevation for which ground echoes are returned is denoted $\phi_2 + \Delta\phi$.

The altitude of the aircraft AV is denoted $h_{craft}$. To determine the error of the angle of elevation without using a so-called accurate value of the aircraft altitude delivered by an onboard sensor, the equation system below is considered:

$$\begin{cases} h_{craft} - h_{s1} + h_{c1} = r_1 \sin(\varphi_1 - \Delta\varphi) \\ h_{craft} - h_{s2} + h_{c2} = r_2 \sin(\varphi_2 - \Delta\varphi) \end{cases}$$

where:

$h_{c1}$ and $h_{c2}$ are the values of the curvature of the earth respectively associated with the distances $r_1$ and $r_2$, and $h_{s1}$ and $h_{s2}$ are the values of the height of the ground, respectively associated with the distances $r_1$ and $r_2$.

Differencing the two equations of the above system gives the elevational pointing error $\Delta\phi$. Considering that $\Delta\phi$ is small, this yields through a finite expansion:

$$\Delta\varphi = \frac{r_1 \sin(\varphi_1) - r_2 \sin(\varphi_2) - (h_{c1} - h_{s1}) + (h_{c2} - h_{s2})}{r_1 \cos(\varphi_1) - r_2 \cos(\varphi_2)}. \quad (1)$$

Various numerical calculation schemes then make it possible to determine $\Delta\phi$, once the values of the various quantities of equation (1) are known. These schemes will be described in greater detail hereinafter.

FIG. 4 details the various steps of a mode of implementation according to the invention.

First of all, the returned echoes are received by the radar antenna, and sampled. It is noted that the sampling can be an oversampling to alleviate a possible deficiency of angular resolution.

Two series of measurements of the power of the returned echoes are then carried out 1, each series being associated with a given distance-bin. The measurements are dependent on the angle of pointing of the radar antenna.

Then in this example a first step 10 of preprocessing the data takes place. It is emphasized that this step is optional.

The data in question are the vertical profiles of the power of the echoes returned following the emission of radar signals. Each vertical profile is formulated on the basis of one of the aforesaid series of measurements. The characteristics of a vertical profile will be described in greater detail hereinafter.

More precisely, the first step 10 can comprise a compensation for the distance migrations when this is necessary. Stated otherwise, for each measurement, there is compensation for the fact that the aircraft moves in the course of the data reception. This preprocessing step 10 can also comprise an alignment of the data in such a way that each measured vertical profile corresponds to the same geographical zone of the ground.

The preprocessing step 10 may not be necessary in the case where a radar antenna of vertical electronic scan type is used. The latter makes it possible to obtain a vertical slice much more rapidly than a mechanical scan radar antenna, and thus to limit the effects of distance migration.

The data are thereafter selected in the course of a second step 20.

More precisely, this step 20 comprises a fast selection of the data as a function of their signal-to-thermal noise ratio, commonly referred to as the SNR.

If this ratio is above a threshold called threshold_SNR, the datum can be utilized and is therefore retained for the rest of the processing. Conversely, data judged to be unreliable (embedded in thermal noise for example) are discarded from the rest of the processing. The threshold threshold_SNR is determined analytically as a function of the desired false alarm probability and of the number of samples arising from the second step. It can moreover (like the other thresholds mentioned in this patent application) be adapted in accordance with contextual variables (geographical zone, season, altitude of the aircraft, etc.).

Another selection criterion is the distance of the distance bin from the radar antenna. If the latter is above a predetermined threshold, referenced threshold_distance, the data associated with the distance bin considered are rejected.

Three steps are thereafter executed in parallel for at least two series of measurements. In this example, the angle of scan is the angle of bearing. The angle of pointing is the angle of elevation. But it is possible to invert the two angles. Nevertheless, this configuration makes it possible to have much more accurate measurements than the inverse configuration.

A step 30 comprises the measurement of the angle of elevation φi associated with the intersection between the ground and the distance bin CDi. The latter is defined by the parameters $(r_i, \theta_i)$, which are respectively the distance between the radar antenna and the distance bin in question, and the angle of bearing of the radar antenna when it is pointing towards the distance bin CDi.

To measure the angle of elevation φi associated with the intersection between the ground and the distance bin CDi, the portion of the power due to the ground echoes is determined within the corresponding vertical profile of the power of the echoes received. The value of the angle of elevation associated with this portion is the angle of elevation φi sought.

By "vertical profile of power" is meant a representation of the variation of the power received and measured by the radar antenna of an aerial transporter, as a function of the angle of elevation of the beam of the radar antenna. Stated otherwise, a vertical profile of power is effected for a given bearing angle/distance bin pair, and each measurement corresponds to an angle of elevation of the beam of the radar antenna.

Figure 5:
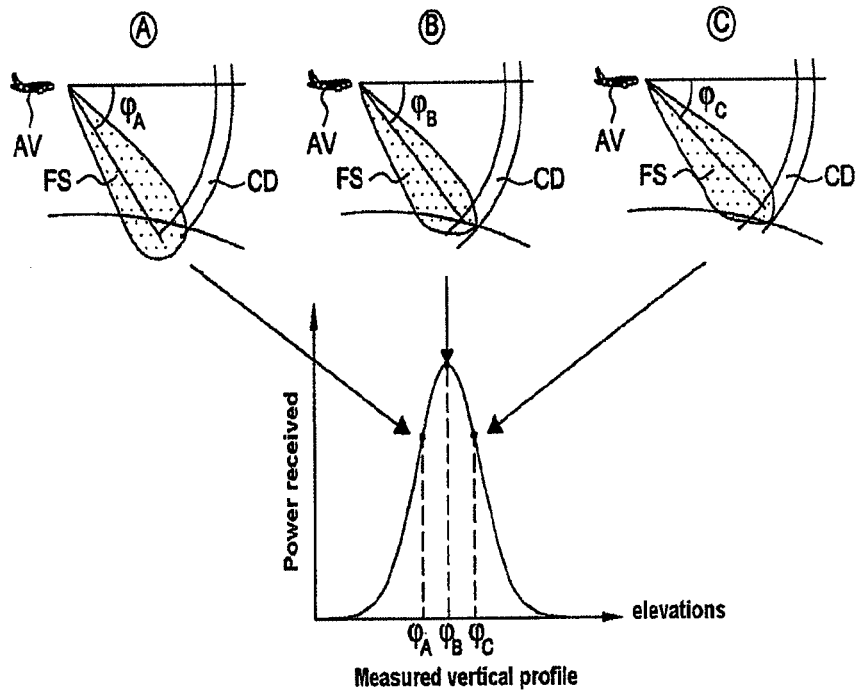
FIG. 5 represents various positions of a radar beam in the course of a step of a mode of implementation of the method according to the invention.

FIG. 5 illustrates an exemplary vertical profile. In each of the three diagrams, respectively A, B and C, the angle of elevation of the beam of the radar antenna, respectively $\phi_A, \phi_B$ and $\phi_C$, varies. For a given distance bin CD, the value of the power returned by the environment is dependent on the angle of elevation. The power maximum of the vertical profile corresponds to the echoes returned by the ground (angle $\phi_B$).

In the absence of any meteorological phenomenon, the formulated vertical profile of power possesses the shape of the radar antenna pattern. The power received is then mainly due to the echoes returned by the ground, termed ground echoes.

Figures 6A, 6B:
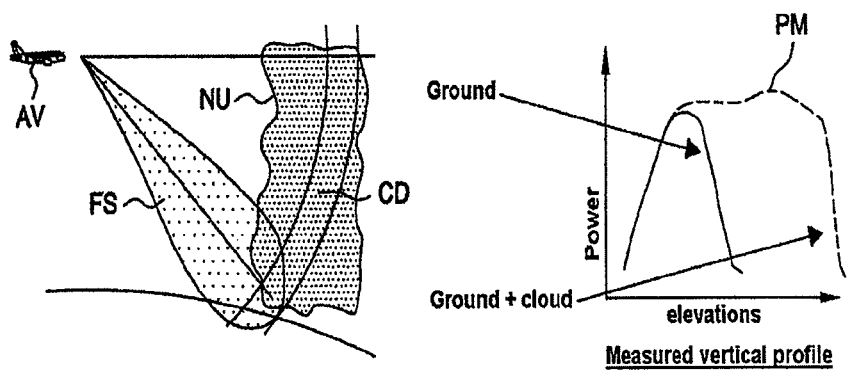
FIG. 6a illustrates another exemplary movement of a radar beam.
FIG. 6b illustrates a vertical profile measured during the movement represented in FIG. 6a, in the presence of meteorological phenomena.

FIG. 6*a* illustrates the case where the radar beam FS of the aircraft AV encounters a cloud NU. In this case, the measured vertical profile PM (here for the distance bin CD), possesses a shape approximately such as that represented in the dashed curve of FIG. 6*b*. The solid portion represents the portion of the power received due to the ground echoes.

Preferably, each vertical profile is formed with the aid of at least a series of two or indeed three distinct measurements.

Figure 7:
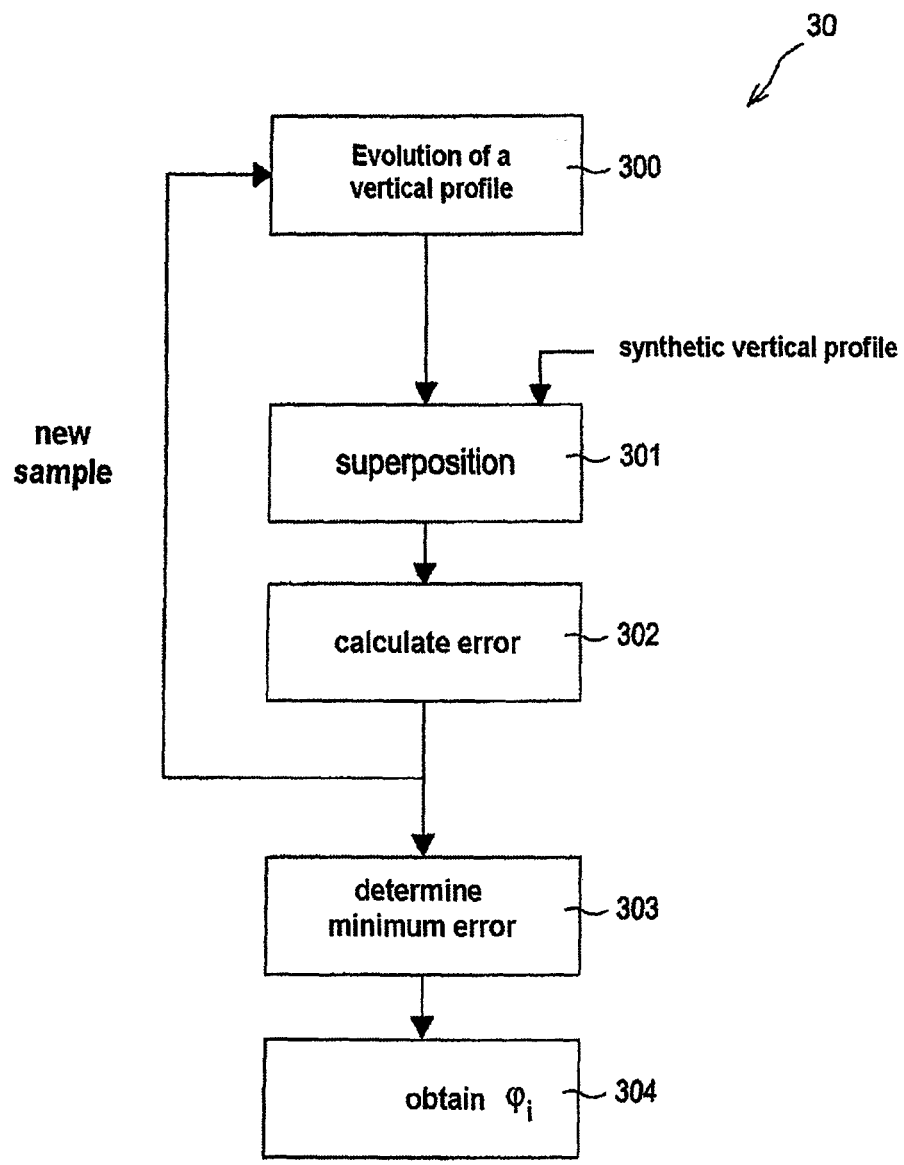
FIG. 7 illustrates in greater detail a step of the mode of implementation of the method according to the invention as represented in FIG. 4.

Reference is now made to FIG. 7 which illustrates in greater detail the step of measuring the angle of elevation $\phi_i$, of the radar beam, when it is directed towards the intersection of a distance bin CDi and the ground, 30.

Accordingly, an aim of step 30 is to determine on the processed vertical profile of power, the power maximum of the portion of the profile corresponding to the power of the ground echoes; the value of the angle of elevation associated with this maximum then corresponding to the angle of elevation $\phi_i$ sought.

The measurement of the angle of elevation $\phi_i$ implements a stored synthetic vertical profile of the ground echoes.

This synthetic vertical profile corresponds to the power of the echoes reflected solely by the ground, following the emission of a radar signal. The shape of the vertical profile of the ground echoes corresponds substantially to the shape of the antenna pattern of the radar antenna, with a parabolic shape.

For example, the synthetic vertical profile can be formulated during the design of the radar and hard-stored within an onboard memory. Preferably, the synthetic vertical profile is normalized in such a way that only its shape is considered subsequently in the processing.

Reference is made to FIG. 7 which illustrates in greater detail a mode of implementation of step 30. We consider a distance bin of rank i, $CD_i$ referenced by the distance $r_i$ and the angle of bearing $\theta_i$.

In the course of a first step 300, therefore formulates a vertical profile of power for the processed distance bin CDi, 300.

Then the stored synthetic profile is superimposed with the vertical profile formulated for the distance bin CDi, 301.

Figure 8:
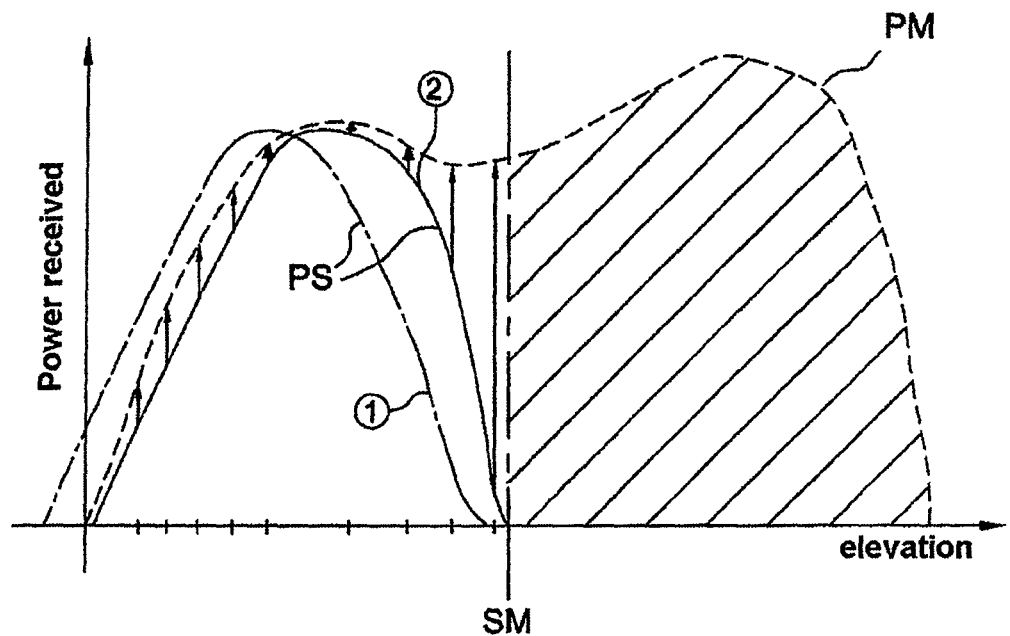
FIG. 8 illustrates in a symbolic manner a process of the step represented in FIG. 7.

This superposition 301 is illustrated more precisely in FIG. 8. This figure represents the vertical profile of power formulated on the basis of a series of measurements PM (dashed) of the distance bin CDi, undergoing processing. The crosses situated on the axis of the elevation correspond to the various samples produced.

In this FIG. 8, the superposition is performed only on the first part of the measured vertical profile, for example for the first N samples (N being an integer). Indeed, the ground echoes corresponding to the angles of elevation directed towards the lowest zones, it is advantageous to limit oneself to the low part of the profile. Consequently, the samples situated to the right of the threshold SM (hatched part) are not considered.

It is noted that in the case where an insufficient number of measurements is available, the inventors have observed that it is possible to apply the first scheme to the whole of the measured profile.

The stored synthetic vertical profile PS is then superimposed on the low part of the profile. In this example, only two possible positions of the synthetic profile with respect to the measured profile PM are represented (curve 1 and curve 2).

Once the two profiles have been superimposed, the error existing between them is calculated, step 302, FIG. 7.

This error is symbolized by vertical arrows in FIG. 8 (curve 2). Preferably, the error is calculated in decibels in such a way that each angle of elevation value has the same weight.

These steps 300 and 302 are repeated for each retained angle of elevation value of the formulated vertical profile of power PM.

Once the errors have been calculated, the minimum error 303 by the set of calculated errors is determined with the aid for example of the least squares. In FIG. 8, the error is a minimum when the synthetic vertical profile of power PS is in the position of curve 2, that is to say when the maximum of the synthetic profile PS corresponds to the maximum of the retained portion of the formulated vertical profile, PM.

Stated otherwise, this yields:

$$\hat{\varphi}_0 = \underset{\varphi_0}{\mathrm{argmin}}\{e(\varphi_0)\} = \underset{\varphi_0}{\mathrm{argmin}}\left\{\frac{1}{N}\sum_{j=1}^{N}|P_{measured}(j) - P_{synthetic}(j,\varphi_0)|\right\}$$

where:

$\hat{\varphi}_0$ is the value of the angle of elevation for which the error is a minimum;

e is the error calculated for the angle of elevation value $\hat{\varphi}_0$

N is the number of samples retained, j is the rank of the processed sample, $P_{measured}(j)$ is the power of the measured vertical profile processed for the sample of rank j, and $P_{synthetic}(j)$ is the power of the synthetic vertical profile for the sample of rank j.

When the synthetic vertical profile is in this position, this signifies that the corresponding part of the measured vertical profile corresponds to the power of the ground echoes. The corresponding angle of elevation $\hat{\varphi}_0$ is the angle of elevation sought $\varphi_i$, that is to say the angle of the radar beam aimed at the distance bin CDi at ground level, 304.

In parallel with the step 30 of measuring the angle of elevation of the radar beam, is evaluated a value dependent on the curvature of the earth $h_{ci}$ for the distance bin CDi $(r_i, \theta_i)$, step 40.

Figure 9:
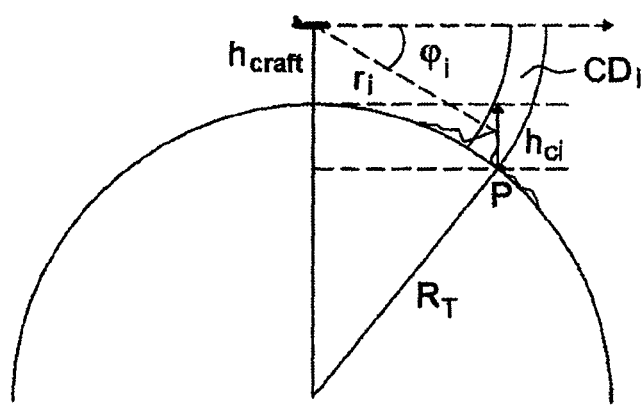
FIG. 9 represents several quantities involved in the course of various steps of the mode of implementation of the method according to the invention as represented in FIG. 4.

The various quantities involved in this evaluation 40 are represented in the sketch of FIG. 9, for an aircraft AV operating at a height $h_{craft}$. The following are represented:

$r_i$ which is the distance between the radar antenna and the processed distance bin CDi, at ground level, $\varphi i$ which is the angle of elevation of the radar antenna aimed at the intersection between the ground and for the distance bin CDi, P which is the point of intersection between the earth (symbolized by the inverted circular arc) and the vertical passing through the point with coordinate $(r_i, \varphi i)$, and $R_T$ which is the terrestrial radius.

Pythagoras' theorem makes it possible to write:

$$(R_T - h_{ci})^2 + (r_i \cos\varphi_i)^2 = R_T^2$$

which then yields:

$$h_{ci} = R_T - \sqrt{R_T^2 - (r_i \cos\varphi_i)^2}.$$

It is noted that the terrestrial radius considered here is the radioelectric radius.

Finally, the height of the ground $h_{si}$ is estimated in the course of a third step 50, executed in parallel for a distance bin CDi.

The estimation of the height $h_{si}$ of the ground can be done by using a digital terrain model, commonly called a DTM by those skilled in the art, 51.

It is first of all necessary to geographically reference the position of the analysed distance bin CDi. The latitude, the longitude and the heading of the aerial transporter are then used to find the latitude and the longitude of the distance bin considered CDi as a function of its distance $r_i$ and of its bearing $\theta_i$.

For this purpose, a change of coordinates from the spherical reference frame, tied to the radar, to the terrestrial geocentric reference frame, is performed.

An approximate value of the altitude is used here. The fact that this value is not very accurate does not decrease the accuracy of the invention (by way of example, an error of 1000 meters in the altitude gives rise to an error of the order of only a thousandth of a degree in latitude/longitude, i.e. of the order of a hundred meters), having regard to the angles of incidence considered.

Once the geographical position has been calculated, the corresponding height of the ground is read from the digital terrain model. To obtain the height of the ground $hs_i$ as defined in FIG. 9, the following formula is used:

$$h_{si} = \frac{h_{si,MNT}}{\cos\alpha_i} \text{ with } \sin\alpha_i = \frac{r_i \cos\varphi_i}{R_T}.$$

This formula is based on an approximation, having regard to the assumption that the distance $r_i$ is small compared with the terrestrial radius $R_T$.

If no digital terrain model is available, or to avoid possible positioning errors in latitude, longitude and heading of the radar, those skilled in the art will know how to obtain an estimation of the height of the ground $hs_i$ on the basis of the value of the angle of elevation $\varphi_i$ measured in the course of step 30.

Once steps 20, 40 and optionally 50 have been carried out, a step of selecting the candidate points takes place, 60.

This selection comprises for example an exclusion of the angle of elevation values $\varphi_i$ attesting not to a ground echo, but to a meteorological echo. Accordingly, the angle of elevation values that are too large are rejected, i.e. those which correspond to heights that are too elevated to be ground (the barometric altitude of the aerial transporter can be used for this selection, for which just an approximate value is sufficient).

Moreover, in the case where step 50 is not carried out, the points corresponding to a zone of relatively constant height of the ground are retained. Indeed, as noted in the following equation:

$$\Delta\varphi_i = \frac{r_i \sin(\varphi_i) - r_{i+L}\sin(\varphi_{i+L}) - (h_{ci} - h_{si}) + (h_{ci+L} - h_{si+L})}{r_i \cos(\varphi_i) - r_{i+L}\cos(\varphi_{i+L})},$$

with L a quantity corresponding to a deviation defined in greater detail later, the terms $h_{s1}$ and $h_{s2}$ cancel out in this case.

In the case where step 50 is carried out, it is possible to consider all the points of the ground whatever their height, given that the latter is known accurately by virtue of the digital terrain model (DTM).

Finally, in the case where the height of the ground is estimated with the aid of the value of the angle of elevation $\varphi_i$, the selection step 60 furthermore comprises an exclusion of the values associated with a threshold height above a predetermined threshold.

Steps 30, 40, 50 and 60 are repeated for at least one other series of measurements, that is to say for another distance bin.

On completion of the selection step 60, a map of the estimated angles of elevation $\varphi_i$, and a map of the values dependent on the curvature of the ground $h_{ci}$ and on the height of the ground $h_{si}$ are delivered respectively for each processed distance bin (here M; M being an integer).

The map of the angles of elevation $\varphi_i$ is subjected to a spatial smoothing, step 70, with the aid of a subsequent spatial integration of the map of the estimated angles of elevation $\varphi_i$.

Once the spatial smoothing has been performed, the error of the angle of elevation $\Delta\varphi_i$ at the instant t considered is calculated, step 80. Various calculation schemes can be used, two of them being presented below.

The estimated elevation angle error $\Delta\hat{\varphi}$, in the case of the first proposed scheme, is given as being equal to the mean of the resulting samples:

$$\Delta\hat{\varphi} = \frac{1}{M}\sum_{i=1...M}\Delta\varphi_i = \frac{1}{M}\sum_{i=1...M}\frac{r_i\sin(\varphi_i) - r_{i+L}\sin(\varphi_{i+L}) - (h_{ci} - h_{si}) + (h_{ci+L} - h_{si+L})}{r_i\cos(\varphi_i) - r_{i+L}\cos(\varphi_{i+L})},$$

With:

$$\Delta\varphi_i = \frac{r_i\sin(\varphi_i) - r_{i+L}\sin(\varphi_{i+L}) - (h_{ci} - h_{si}) + (h_{ci+L} - h_{si+L})}{r_i\cos(\varphi_i) - r_{i+L}\cos(\varphi_{i+L})},$$

where L is chosen such that the deviation between two angles $\varphi_i$ and $\varphi_{i+L}$ is not too small. Typically values corresponding to an angular deviation of at least 1 to 2 degrees are used.

Moreover, the scheme also makes it possible to provide an estimation of the altitude of the aircraft $\hat{h}_{craft}$ such that:

$$\hat{h}_{craft} = \frac{1}{K}\sum_{i=1...K}r_i\sin(\varphi_i - \Delta\varphi) + h_{si} - h_{ci}.$$

The second scheme is based on least squares. It is also considered here that the error to be estimated $\Delta\varphi_i$ is small. The aforesaid equation:

$$\begin{cases} h_{craft} - h_{s1} + h_{c1} = r_1\sin(\varphi_1 - \Delta\varphi) \\ h_{craft} - h_{s2} + h_{c2} = r_2\sin(\varphi_2 - \Delta\varphi), \end{cases}$$

is then expanded such that for a distance bin situated at a distance $r_i$ from the radar antenna, we have:

$$h_{craft} + \Delta\varphi r_i \cos\varphi_i = r_i\sin\varphi_i + h_{si} - h_{ci}, \text{ for } i=1\ldots M.$$

The estimate of the pointing error and the altitude obtained at the previous instants 90 are delivered in the course of the calculation step 80.

This system of M equations in two unknowns $h_{craft}$ and $\Delta\varphi_i$ takes account of the whole set of measurements made for a given bearing angle, but also in the course of the movement of the aircraft. It can then be cast into matrix form such that:

$$Hx = y,$$

with:

$$H = \begin{pmatrix} 1 & r_i\cos\varphi_i \\ \vdots & \vdots \\ 1 & r_{i+M}\cos\varphi_{i+M} \end{pmatrix},$$

$$x = \begin{pmatrix} h_{craft} \\ \Delta\varphi_i \end{pmatrix},$$

$$y = \begin{pmatrix} r_i\sin\varphi_i + h_{si} - h_{ci} \\ \vdots \\ r_{i+M}\sin\varphi_{i+M} + h_{si+M} - h_{ci+M} \end{pmatrix}.$$

The solution 81 of this system of equations in the least squares sense is given by:

$$\hat{x} = (H^T H)^{-1} H^T y.$$

This second scheme has the advantage of being particularly inexpensive in calculation time, given that just a "2*2" matrix has to be inverted, and two multiplications of vectors must be performed.

Moreover, the solution takes account directly of all the measurements, and not just of the last two measurements, like the first scheme.

In the same manner as the first scheme proposed, the candidate data will have to be selected correctly so that the matrix to be inverted is well conditioned. Nevertheless regularization schemes can be employed in the case of poorly conditioned systems.

Moreover, if the number of series of measurements is not sufficient to correctly estimate the error in the pointing angle, no estimated error value is output by the scheme.

Furthermore, so as to provide confidence in the estimation of the pointing error, the variance of the samples 81 is used. If this variance exceeds a certain threshold, then compensation for the pointing error $\Delta\varphi$ is not possible.

Finally, the calculation step 80 can comprise a temporal integration which takes account of the fact that the pointing error $\Delta\varphi$ to be estimated may vary over time. The temporal integration will therefore be done over a sufficiently short time. If the pointing error to be estimated $\Delta\varphi$ is periodic, an adaptive scheme can be implemented to determine the period. The temporal integration will thus be done over a fraction of the estimated period.

The estimated value of the pointing error $\Delta\varphi$ thus produced can be dispatched to the controller of the antenna or to other algorithms in order to be compensated, step 100.

Figure 10:
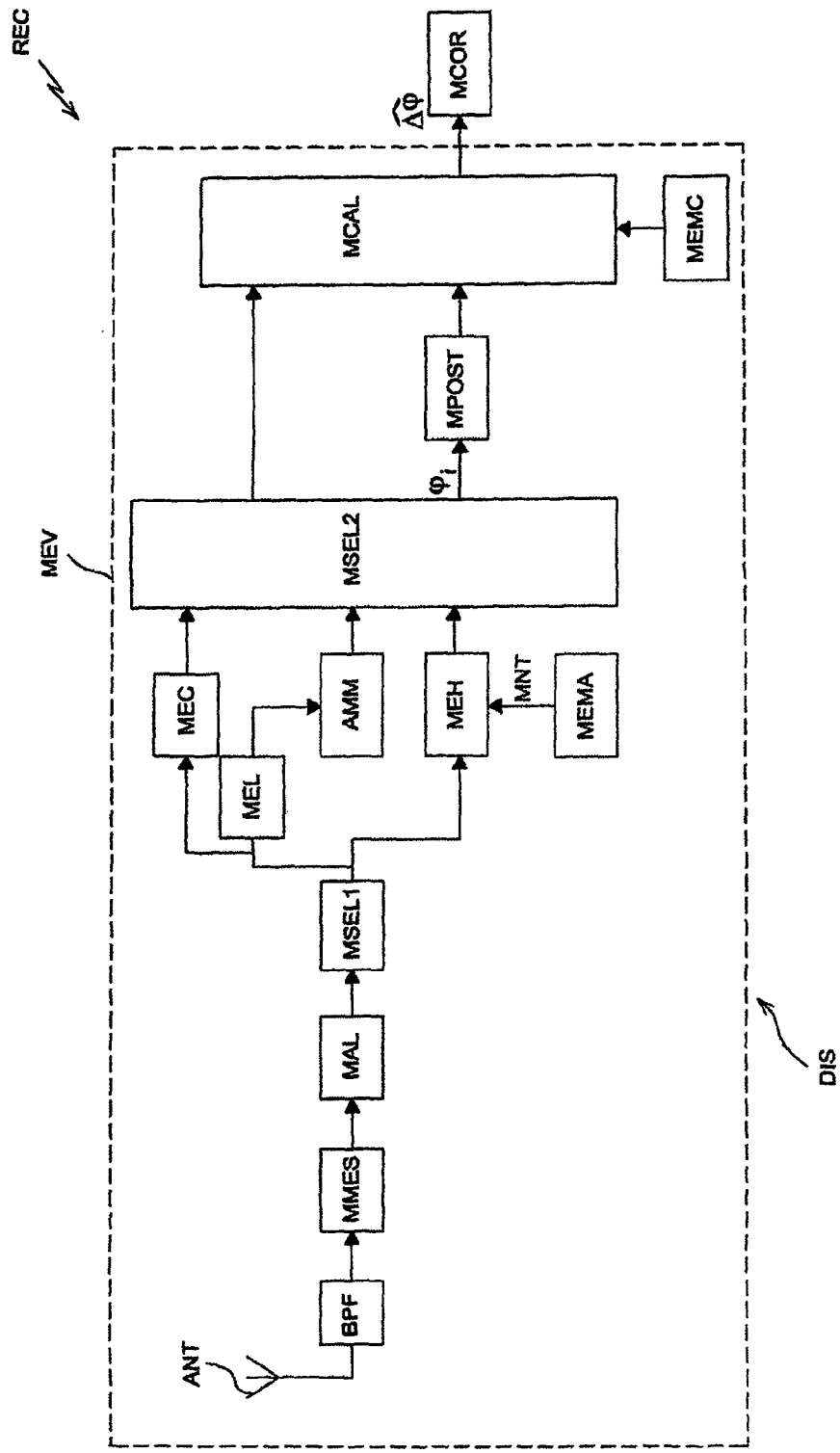
FIG. 10 represents an embodiment of a device according to the invention.

FIG. 10, illustrating an embodiment of a device DIS according to the invention, able to implement a method according to the invention, for example the mode of implementation described above, is now referred to.

In this example, the device DIS is incorporated within a receiver REC, for example of radar type. The device DIS is preferably implemented in a software manner.

It comprises a means MCOR for correcting the pointing error, coupled to a means for evaluating the latter MEV.

More precisely, the evaluation means MEV comprises an antenna ANT able to receive the echoes returned and for a given angle of scan, and to perform a series of two measurements of the power of these echoes returned following the emission of radar signals. It is noted that for a given angle of scan, the antenna ANT performs at least two series of measurements for various pointing angles (here at least two different values of the pointing angle).

The antenna ANT is coupled to a bandpass filter BPF so as to select a frequency band.

The output of the bandpass filter BPF is linked to a measurement means MMES able to carry out at least two series of measurements of the power of the echoes returned and received by the radar antenna ANT, each series being associated with a given distance bin, the measurements being dependent on the angle of pointing of the radar antenna.

The output of the measurement means MMES is linked to an alignment means MAL able to align the data received.

A selection means MSEL1 then performs a selection of the valid data (for example having a signal-to-noise ratio above a given threshold, or else associated with a distance bin sufficiently close to the radar antenna).

The output of the selection means MSEL1 is coupled to a means for formulating vertical profiles MEL on the basis of the series of measurements of power of the echoes received, made for a given angle of scan, as a function of the pointing angle.

Another measurement means MMA is then able to measure the pointing angle related to the ground echoes for each corresponding vertical profile.

The output of the selection means MSEL1 is also coupled to a means for estimating the height of the ground MEC and to a means for evaluating the height of the ground MEH.

The latter is coupled to a memory MEMA (which can be the same as the memory MEMB), so as to receive a stored digital terrain model.

As a variant, the height of the ground can be evaluated directly within the other measurement means AMM, on the basis of each pointing angle measured for the ground echoes.

Another selection means MSEL2 is able to select the valid data, that is to say:

angles of elevation actually related to ground echoes and not meteorological phenomena. Or else:

ground zones having a relatively constant height to within an error.

A post-integration means MPOST performs a spatial smoothing on the angle of elevation values after selection of the data by the other selection means MSEL2.

Finally a calculation means MCAL is able to calculate the pointing error for the instant t considered, with the aid notably of the results of the previous instants, stored within a memory MEMC.

The calculation means MCAL is able to implement one of the two calculation schemes described above.

The calculated pointing error $\Delta\hat{\phi}$ is then transmitted to the correction means MCOR so as to compensate for this error.

Figure 11:
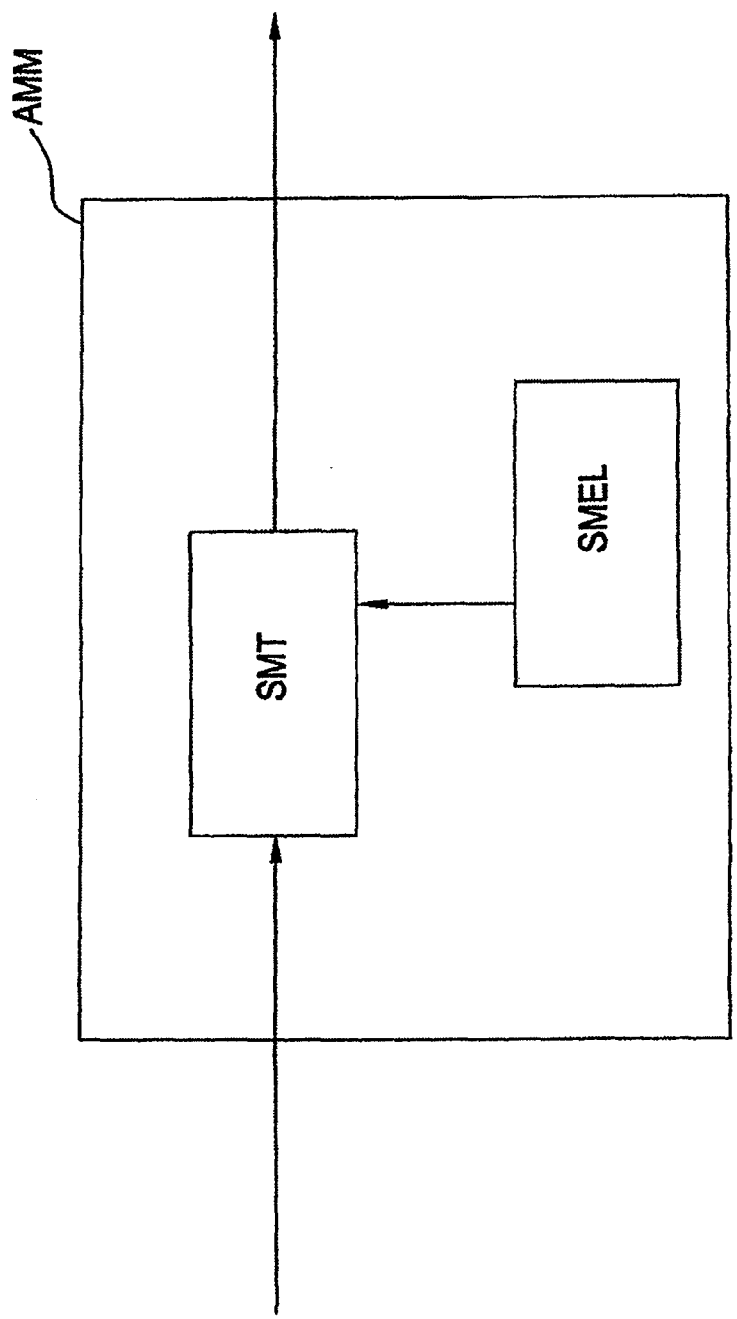
FIG. 11 illustrates in greater detail a means of the embodiment of the device of FIG. 10.

FIG. 11 illustrates for its part an embodiment of the other measurement means AMM.

The latter comprises a sub-means SMEL for formulating a synthetic vertical profile of the power of the echoes returned by the ground alone and a processing sub-means able for each measured vertical profile:

to superimpose the synthetic vertical profile with the measured vertical profile considered, for various values of the angle of scan, to calculate the error existing between the measured vertical profile and the synthetic vertical profile, for each value considered of the angle of scan, to select the value of the pointing angle for which the calculated error is a minimum.

What is claimed is:

1. A method for processing airborne radar signals in a radar receiver to correct an erroneous angle of pointing of a radar beam, comprising an evaluation of an error in a pointing angle for a constant height of an aerial transporter, and comprising, for a given angle of scan:

carrying out at least two series of measurements of a power of echoes returned following an emission of radar signals with a radar receiver, each series being associated with a given distance-bin, the measurements being dependent on an angle of pointing of a radar antenna, formulating a vertical profile of the power of the echoes returned for each series of measurements with the radar receiver, and then measuring on a basis of each vertical profile, the pointing angle corresponding to a power of the echoes returned by the ground alone with the radar receiver, and calculating an error in the pointing angle on the basis of the measured pointing angles with the radar receiver, wherein the measuring of the pointing angle for which ground echoes are returned further comprises obtaining a synthetic vertical profile of the power of the echoes returned by the ground alone, and for each measured vertical profile:

a superposition of the synthetic vertical profile with the formulated vertical profile of power considered, doing so for various values of the angle of pointing, a calculation of the error existing between the formulated vertical profile of power and the synthetic vertical profile, for each value of the pointing angle considered, and a determination of the value of the pointing angle for which the calculated error is a minimum, this value corresponding to the pointing angle for which ground echoes are returned.

2. The method according to claim 1, in which the calculation of the error in the pointing angle is carried out in a dynamic manner.

3. The method according to claim 2, in which for a given distance bin, the calculation of the error in the pointing angle is furthermore dependent on a curvature of the earth, evaluated on the basis of the measured pointing angle and an estimated height of the ground ($h_{si}$).

4. The method according to claim 3, in which the height of the ground is estimated with the aid of a digital terrain model.

5. The method according to claim 4, wherein the evaluation of the error in the pointing angle further comprises an exclusion of the measured pointing angle values signalling the presence of meteorological echoes.

6. The method according to claim 5, in which a collation is performed only for certain points of the formulated vertical profile, corresponding to pointing angle values below a given threshold.

7. The method according to claim 6, in which the calculation of the error in the pointing angle is based on the following expression:

$$\Delta\varphi_i = \frac{r_i \sin(\varphi_i) - r_{i+L}\sin(\varphi_{i+L}) - (h_{ci} - h_{si}) + (h_{ci+L} - h_{si+L})}{r_i \cos(\varphi_i) - r_{i+L}\cos(\varphi_{i+L})}, ,$$

where:

$\Delta\phi_i$ is the radar beam pointing angle error evaluated at the instant t, $r_i$ and $r_{i+L}$ are the distances respectively between the radar antenna and the two distance bins considered at ground level, $\phi_i$ and $\phi_{i+L}$ are the two pointing angles, respectively associated with the distances $r_i$ and $r_{i+L}$, $h_{si}$ and $h_{si+L}$ are the ground height values respectively situated at the distances $r_i$ and $r_{i+L}$, and $h_{ci}$ and $h_{ci+L}$ connote values induced by the curvature of the earth and respectively associated with the distances $r_i$ and $r_{i+L}$.

8. The method according to claim 5, in which a collation is performed for the whole set of points of the measured vertical profile, if the number of points of the measured vertical profile is below a given threshold.

9. The method according to claim 8, in which the calculation of the error in the pointing angle is based on the following expression:

$$\Delta\varphi_i = \frac{r_i \sin(\varphi_i) - r_{i+L}\sin(\varphi_{i+L}) - (h_{ci} - h_{si}) + (h_{ci+L} - h_{si+L})}{r_i \cos(\varphi_i) - r_{i+L}\cos(\varphi_{i+L})}, ,$$

where:

$\Delta\phi_i$ is the radar beam pointing angle error evaluated at the instant t, $r_i$ and $r_{i+L}$ are the distances respectively between the radar antenna and the two distance bins considered at ground level, $\phi_i$ and $\phi_{i+L}$ are the two pointing angles, respectively associated with the distances $r_i$ and $r_{i+L}$, $h_{si}$ and $h_{si+L}$ are the ground height values respectively situated at the distances $r_i$ and $r_{i+L}$, and $h_{ci}$ and $h_{ci+L}$ connote values induced by the curvature of the earth and respectively associated with the distances $r_i$ and $r_{i+L}$.

10. The method according to claim 8, in which the calculation of the error in the pointing angle is based on the following expression:

$$\hat{x} = (H^T H)^{-1} H^T y, \text{ with}$$

$$\hat{x} = \begin{pmatrix} h_{craft} \\ \Delta\varphi \end{pmatrix}$$

where $h_{craft}$ is the altitude of the aerial transporter and $\Delta\phi$ is the error of the angle of scan of the radar beam, $$H = \begin{pmatrix} 1 & r_1 \cos\varphi_1 \\ \vdots & \vdots \\ 1 & r_M \cos\varphi_M \end{pmatrix},$$

where M is the number of measurements performed of the power of the echoes returned, $r_1 \ldots r_M$ are the distances between the radar antenna and each of the M distance bins considered at ground level, and $\phi_1 \ldots \phi_M$ are the M pointing angles respectively associated with the distances $r_1 \ldots r_M$, and $$y = \begin{pmatrix} r_1 \sin\varphi_1 + h_{s1} - h_{c1} \\ \vdots \\ r_M \sin\varphi_M + h_{sM} - h_{cM} \end{pmatrix},$$

where $h_{s1} \ldots h_{s2}$ are the ground height values respectively associated with the distances $r_1 \ldots r_M$, and $h_{c1} \ldots h_{cM}$ connote the values of the curvature of the earth, respectively associated with the distances $r_1 \ldots r_M$.

11. The method according to claim 10, in which the angle of pointing is the angle of elevation and the angle of scan is the angle of bearing.

12. The method according to claim 11, in which each measurement series comprises at least three measurements.

13. The method according to claim 3, in which for a given distance bin, the height of the ground ($h_{si}$), is estimated directly on the basis of the corresponding measured pointing angle.

14. The method according to claim 13, wherein the evaluation of the error in the pointing angle further comprises:

an exclusion of the pointing angle values signalling the presence of meteorological echoes, and an exclusion of the values of angle of elevation associated with a threshold height above a predetermined threshold.

15. The method according to claim 1, wherein a collation is performed only for certain points of the formulated vertical profile, corresponding to pointing angle values below a given threshold.

16. The method according to claim 15, wherein the calculation of the error in the pointing angle is based on the following expression:

$$\Delta\varphi_i = \frac{r_i \sin(\varphi_i) - r_{i+L}\sin(\varphi_{i+L}) - (h_{ci} - h_{si}) + (h_{ci+L} - h_{si+L})}{r_i \cos(\varphi_i) - r_{i+L}\cos(\varphi_{i+L})},,$$

where:

$\Delta\phi_i$ is the radar beam pointing angle error evaluated at the instant t, $r_i$ and $r_{i+L}$ are the distances respectively between the radar antenna and the two distance bins considered at ground level, $\phi_i$ and $\phi_{i+L}$ are the two pointing angles, respectively associated with the distances $r_i$ and $r_{i+L}$, $h_{si}$ and $h_{si+L}$ are the ground height values respectively situated at the distances $r_i$ and $r_{i+L}$, and $h_{ci}$ and $h_{ci+L}$ connote values induced by the curvature of the earth and respectively associated with the distances $r_i$ and $r_{i+L}$.

17. The method according to claim 1, wherein a collation is performed for the whole set of points of the measured vertical profile, if the number of points of the measured vertical profile is below a given threshold.

18. The method according to claim 17, in which the calculation of the error in the pointing angle is based on the following expression:

$$\Delta\varphi_i = \frac{r_i \sin(\varphi_i) - r_{i+L}\sin(\varphi_{i+L}) - (h_{ci} - h_{si}) + (h_{ci+L} - h_{si+L})}{r_i \cos(\varphi_i) - r_{i+L}\cos(\varphi_{i+L})},,$$

where:

$\Delta\phi_i$ is the radar beam pointing angle error evaluated at the instant t, $r_i$ and $r_{i+L}$ are the distances respectively between the radar antenna and the two distance bins considered at ground level, $\phi_i$ and $\phi_{i+L}$ are the two pointing angles, respectively associated with the distances $r_i$ and $r_{i+L}$, $h_{si}$ and $h_{si+L}$ are the ground height values respectively situated at the distances $r_i$ and $r_{i+L}$, and $h_{ci}$ and $h_{ci+L}$ connote values induced by the curvature of the earth and respectively associated with the distances $r_i$ and $r_{i+L}$.

19. The method according to claim 17, in which the calculation of the error in the pointing angle is based on the following expression:

$\hat{x} = (H^T H)^{-1} H^T y$, with $$\hat{x} = \begin{pmatrix} h_{craft} \\ \Delta\varphi \end{pmatrix}$$

where $h_{craft}$ is the altitude of the aerial transporter and $\Delta\phi$ is the error of the angle of scan of the radar beam, $$H = \begin{pmatrix} 1 & r_1 \cos\varphi_1 \\ \vdots & \vdots \\ 1 & r_M \cos\varphi_M \end{pmatrix},$$

where M is the number of measurements performed of the power of the echoes returned, $r_1 \ldots r_M$ are the distances between the radar antenna and each of the M distance bins considered at ground level, and $\phi_1 \ldots \phi_M$ are the M pointing angles respectively associated with the distances $r_1 \ldots r_M$, and $$y = \begin{pmatrix} r_1 \sin\varphi_1 + h_{s1} - h_{c1} \\ \vdots \\ r_M \sin\varphi_M + h_{sM} - h_{cM} \end{pmatrix},$$

where $h_{s1} \ldots h_{s2}$ are the ground height values respectively associated with the distances $r_1 \ldots r_M$, and $h_{c1} \ldots h_{cM}$ connote the values of the curvature of the earth, respectively associated with the distances $r_1 \ldots r_M$.

20. The method according to claim 19, in which the angle of pointing is the angle of elevation and the angle of scan is the angle of bearing.

21. The method according to claim 20, in which each measurement series comprises at least three measurements.

22. A device for processing signals of an airborne radar configured to correct an erroneous angle of pointing of a radar beam, and further configured to evaluate an error in the pointing angle for a constant height of an aerial transporter, further comprising:

a radar receiver configured to carry out at least two series of measurements of the power of echoes returned following an emission of radar signals, each series being associated with a given distance bin, the measurements being dependent on the angle of pointing of the radar antenna, the radar receiver further configured to formulate a vertical profile of power of the echoes returned for each series of measurements, the radar receiver further configured on the basis of each vertical profile to measure the angle of pointing corresponding to a power of the echoes returned by the ground alone, and the radar receiver further configured to calculate the error in the pointing angle on the basis of the said measured pointing angles, wherein the receiver is further configured to obtain a synthetic vertical profile of the power of the echoes returned by the ground alone and the receiver further configured to process for each formulated vertical profile:

to superimpose the synthetic vertical profile with the formulated vertical profile considered, for various values of the angle of pointing, to calculate the error existing between the formulated vertical profile and the synthetic vertical profile, for each value of the pointing angle considered, and to determine the value of the pointing angle for which the calculated error is a minimum.

23. A radar incorporating a device according to claim 22.

* * * * *